June 27, 1972   J. O. HICE, SR   3,672,908
METHOD OF HEAT PROCESSING FOOD
Filed April 8, 1970   4 Sheets-Sheet 1

INVENTOR
Jack O. Hice

ATTORNEY

June 27, 1972   J. O. HICE, SR   3,672,908
METHOD OF HEAT PROCESSING FOOD
Filed April 8, 1970   4 Sheets-Sheet 2
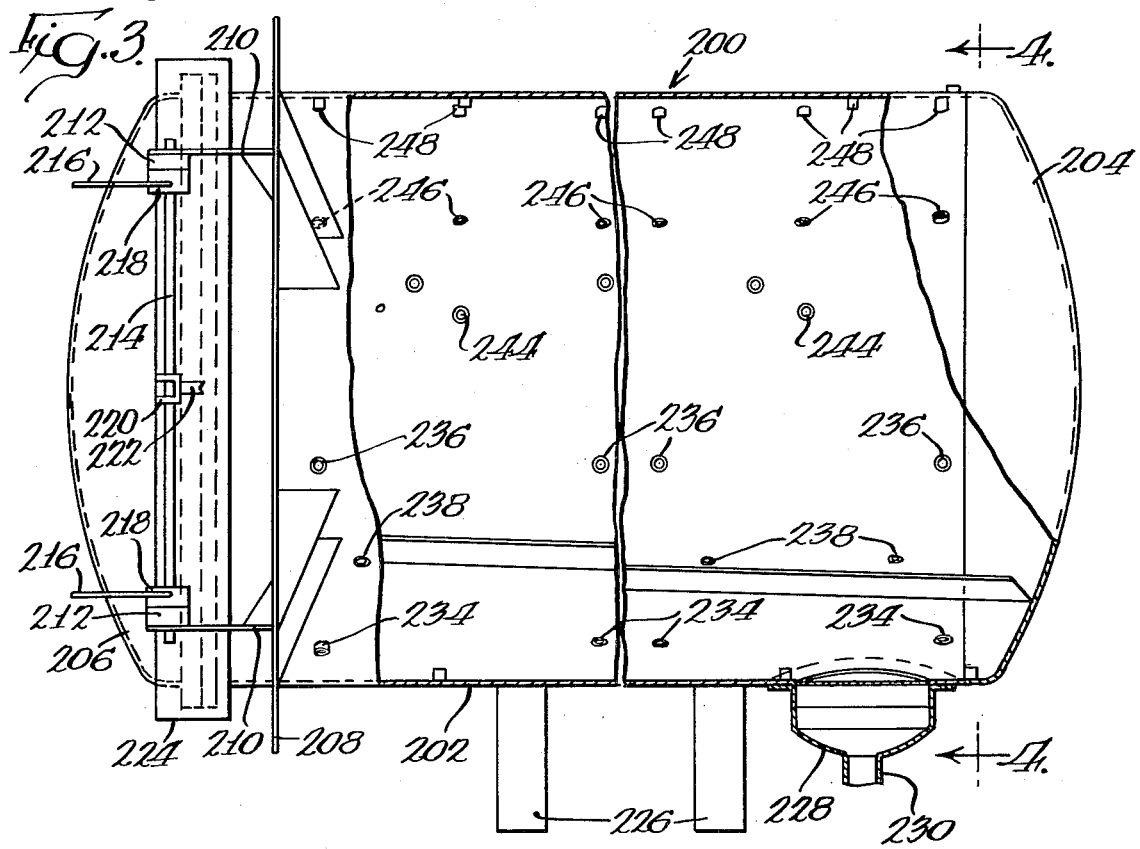
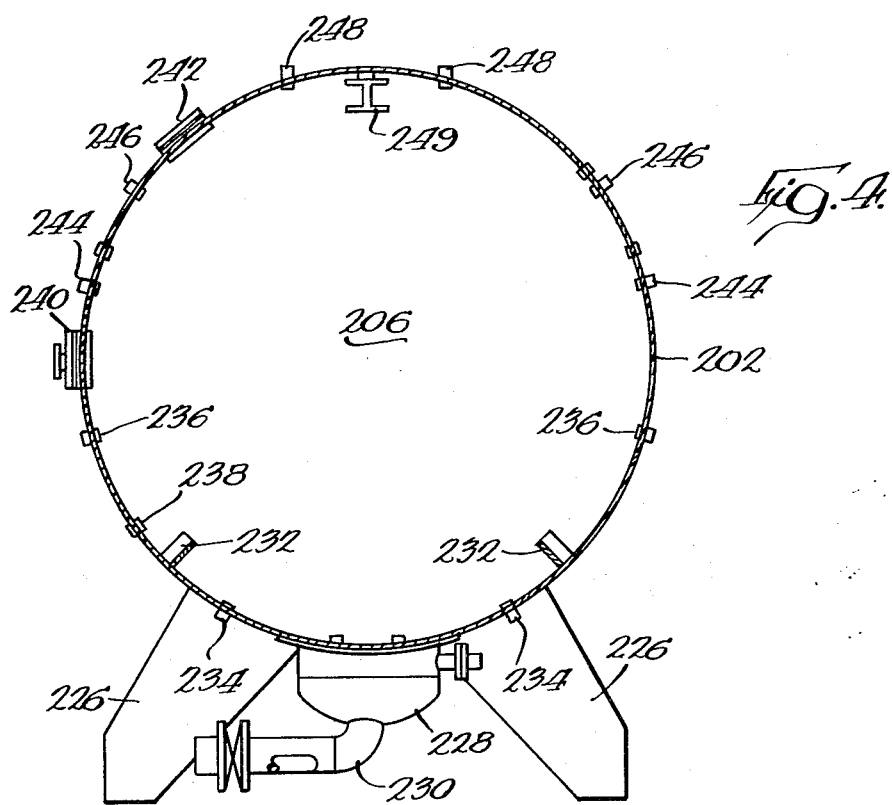

Fig. 6.

3,672,908
METHOD OF HEAT PROCESSING FOOD
Jack O. Hice, Sr., Fort Lauderdale, Fla. (231 Commercial Blvd., Lauderdale-by-the-Sea, Fla. 33308)
Continuation-in-part of application Ser. No. 585,230, Oct. 17, 1966. This application Apr. 8, 1970, Ser. No. 26,728
Int. Cl. A22c 18/00, 25/00
U.S. Cl. 99—1     17 Claims

ABSTRACT OF THE DISCLOSURE

A method of heat treating food including the steps of subjecting the food to be heat treated to superatmospheric pressure in a gaseous atmosphere prior to the application of heat to the food, applying heat to the food while maintaining the superatmospheric pressure on the food, rapidly cooling the food after the food has been heat treated to a desired extent, and removing the gaseous atmosphere under superatmospheric pressure from the food; and apparatus for practicing the method.

CROSS REFERENCE

This application is a continuation-in-part of my copending application Ser. No. 585,230, filed Oct. 17, 1966, and entitled "Method and Apparatus for Cooking Moist Foods," now abandoned.

BACKGROUND OF THE INVENTION

This invention relates generally to a method and means for cooking foods such as meat, poultry, seafood, vegetables and like moisture-containing foods and more particularly, to a cooking process wherein pressure and temperature are independently controlled primarily to the ends of improving the quality of the finished products and of optimizing the yields thereof.

Essentially, the present invention is directed to a method of cooking moist foods in a gaseous atmosphere, i.e., in a non-liquid environment, the results achieved thereby being exceptionally and unexpectedly advantageous when compared, for example, to cooking the product in water, fat or other like cooking medium. Therefore, the process described herein will be understood to apply to cooking a product in a gaseous atmosphere, the independent control of temperature and pressure being utilized herein in combination therewith.

Further, I have found that the subjection of moist foods to pressures above atmospheric prior to the application of the heat required for the accomplishment of the actual cooking phase, the sustenance of such pressures following completion of the cooking phase and the quick-chilling of the cooked product prior to the complete removal of such superatmospheric pressures, unexpectedly and substantially improves the nature and quality of the finished product. The steps are preferably applied in combination although when separately utilized, beneficial results are also obtained although to a lesser degree.

SUMMARY OF THE INVENTION

An object of the present invention resides in a procedure for cooking foods wherein the actual cooking time may be precisely controlled to the end of arresting shrinkage of the product subsequent to the required cooking phase.

The invention further contemplates treatment of the food product prior to the application of the cooking heat thereto, whereby the vaporization of the moisture thereof will be minimized prior to and during the actual cooking phase.

Also attendant among the objectives and advantages of this invention is the provision of a food cooking process capable of preserving the essential nutritional and flavor values of the food to thereby render cooked products of exceptionally desirable taste and quality.

Another object is to provide a method for preparing a cooked food product wherein retardation of bacterial growth and of other contamination factors following the cooking phase is beneficially accomplished by rapidly reducing the cooked product to below the critical temperature range otherwise most conducive to organism growth.

A further object resides in the provision of a process of the foregoing character wherein the product formed will be rapidly cooled and thus integral and easy to handle preceding the removal thereof from the cooking apparatus utilized.

Another object resides in a method of cooking a moist food product in a gaseous environment whereby subsequent to the cooking phase the surface of the cooked product can be rapidly chilled to cause contraction of the cells thereof to thereby seal said surface and to thus arrest further escape of volatiles entrained within the product.

Still another object is to provide a method of cooking foods under prescribed conditions, one such condition being the maintenance of the food in a gaseous atmosphere whereby the product substantially retains its precooked configuration.

A still further object resides in novel apparatus especially adapted to carrying out the improved process advanced herein.

Another object is to provide a new process and apparatus which will be applicable in and adaptable to large food service operations, e.g., hospitals, schools, cafeterias or the like, and food processing plants where exact control over the yield and character of the finished cooked product is essential.

The foregoing objects are accomplished in the inventive method by a procedure involving four basic steps as follows:

(1) Applying pressure to the food in a gaseous atmosphere prior to the application of heat thereto;
(2) Applying heat to the food while maintaining the pressure;
(3) Thereafter rapidly cooling the food; and
(4) Releasing the pressure applied to the food.

The basic procedure may be modified by the provision of a short time lag between the application of pressure to the food and the application of heat thereto. Additionally, the application of heat to the food from an external source may be terminated short of the food reaching a desired internal temperature whereby the heat in the outer layers of the food will continue to penetrate inwardly to raise the temperature of the internal portions of the food to the desired final processing temperature. At this time, if desired, the food may be held at a temperature equal to the desired internal temperature for tenderization purposes. Also, the step of releasing the pressure applied to the food can follow the completion of the cooling step or, in the alternative, be initiated before the cooling step is terminated but after the cooling step has been initiated.

The foregoing method may be practiced by any of a variety of forms of suitable apparatus disclosed herein. Common to each form is a pressure vessel in which the food to be processed may be located for batch processing purposes. However, it will be recognized that the method as well as the apparatus disclosed herein can be easily adapted to continuous processing.

Each form of pressure vessel includes a means for introducing gas under pressure such as air or an inert gas for the purpose of prepressurizing the food. Each additionally includes a means for heating the contents of the vessel. The various embodiments disclosed illustrate heating means in the form of electrical heating element, steam jackets surrounding the vessel and steam inlets for the admission of free steam into the vessel.

Each form of apparatus also includes a means for rapidly cooling the food. According to one embodiment, a means for spraying a cooling agent on the food is utilized while in another a cooling coil in which refrigerant is circulated is located to surround the food support area within the vessel. In still embodiment, the cooling means may comprise a jacket surrounding the vessel into which a cooling agent may be introduced.

One embodiment of an apparatus made according to the invention additionally includes control means for controlling prepressurization, the application of heat, the cooling and the release of pressure in a desired order. The same embodiment also includes means for practicing various peripheral features such as basting the food to be processed with juices exuded therefrom; cleaning the vessel after processing has been completed therein; and a means whereby exudate from the food may be concentrated.

Other objects of the invention will become apparent from the following specification taken in conjunction with the accompanying drawings.

DESCRIPTION OF THE DRAWINGS

FIG. 3 is a side elevation of still another form of apparatus with parts shown in section;

FIG. 4 is a vertical section taken approximately along the line 4—4 of FIG. 3;

FIG. 6 is an electrical schematic depicting the electrical controls for the various control mechanisms illustrated in FIG. 5.

DESCRIPTION OF THE PREFERRED EMBODIMENTS

Figure 1:
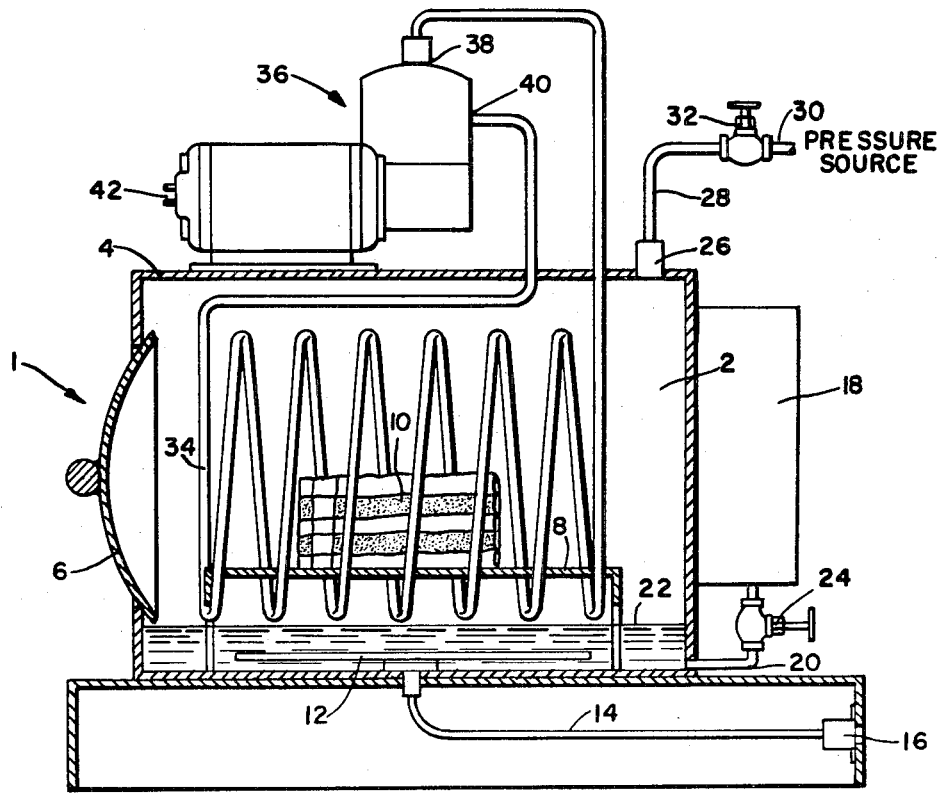
FIG. 1 is a vertical section of one form of an apparatus made according to the invention and which may be employed in practicing the inventive method.

Referring now to FIG. 1 of the drawings, there is shown a cooking apparatus, generally designated 1, of the pressure vessel or retort type which includes heating means, pressurizing means and cooling means, each being operable independently of the others to respectively permit selective heating, pressurizing and cooling of a cooking chamber 2, thereby enabling effectuation of the process hereinafter set forth.

More specifically, the cooking chamber 2 will be seen to be defined by a receptacle 4 provided with an inside door 6 enabling access to an area 8 in which the food 10 to be cooked is disposed.

The heating means of the embodiment illustrated in FIG. 1 comprises an electrical heating element 12 positioned at the bottom of cooking chamber 2 and which is suitably connected by cord 14 to a source of electric current 16. A reservoir 18 contains water which can be introduced through a conduit 20 into the cooking chamber until a water level indicated at 22 sufficient to cover said heating element is attained, the level being manually controllable by a valve 24.

The pressurizing means illustrated in FIG. 1 comprises a fitting 26 to which a conduit 28 is connected for receipt of air, inert gas such as nitrogen or helium, or other suitable pressurized fluid from a source (not shown) in communication with a conduit 30. A valve 32 is manually operable to permit the introduction or release of pressure to or from the cooking chamber 2.

The cooling means employed in the embodiment shown in FIG. 1 include a tubular refrigeration coil 34 disposed in the cooking area 8 and in heat exchange relation with said cooking chamber 2. A motor-compressor unit 36 is connected to the coil 34 as at 38 and 40, to compress and circulate coolant within the coil 34 in the conventional manner and energizable by a suitable electric power source connectible to the same at 42. Accordingly, the cooling means is capable of rapidly reducing the temperature within the cooking chamber 2 while the actual coolant fluid remain hermetically sealed within said refrigeration coil and therefore in non-contacting relation with the food 10 being treated within the cooking chamber 2.

Figure 2:
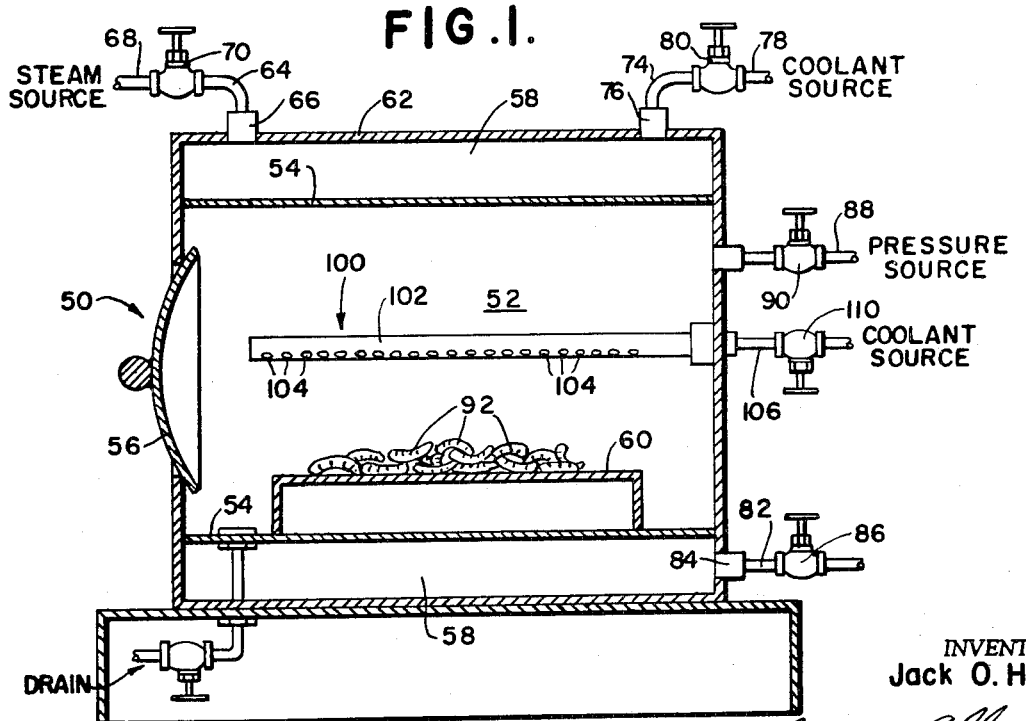
FIG. 2 is a vertical section of a modified form of apparatus made according to the invention and which may also be utilized in practicing the inventive method.

Referring now to FIG. 2 of the drawings, a modified embodiment of a cooking apparatus made according to the invention, generally designated 50, is provided with independently controllable and operable heating, pressurizing and cooling means capable of readily varying the conditions ambient within a cooking chamber 52 thereof. The chamber 52 is defined by receptacle 54 having an inwardly opening door 56 to afford access to said cooking chamber 52.

In the embodiment shown in FIG. 2, the heating and cooling means comprises a double-walled jacketed area 58 disposed peripherally of cooking area 60 and defined by the receptacle 54 and an outer wall 62. The jacketed area 58 is alternately and selectively operable for heating or cooling said cooking chamber.

To provide heat to the cooking chamber 52, a conduit 64 is connected to fitting 66 in fluid communication with the jacketed area 58. A steam source or other suitable heating medium source (not shown) is connected to the conduit 64 by a conduit 68 and a valve 70 interposed between conduits 64 and 68 is manually operable to regulate the pressure within the jacketed area 58 and arrest the flow of the heating medium into the jacketed area 58 upon termination of the cooking phase.

Alternately, the jacketed area 58 may be utilized to cool rather than heat the cooking chamber 52. Accordingly, a conduit 74 is connected to fitting 76 for fluid communication with the jacketed area 58, to introduce liquid nitrogen or other suitable coolant into the same from conduit 78. A valve 80 is interposed between the conduits 74 and 78 and is manually operable to control the flow of coolant to the jacketed area 58.

Further, there is provided a conduit 82 connected to a fitting 84 communicating with the jacketed area 58 to provide means for releasing the heating medium therefrom prior to the introduction of coolant thereinto and a manually operable valve 86 is provided to control such release of the heating medium.

The pressurizing means employed in the FIG. 2 embodiment is generally similar to the means above-described with respect to the FIG. 1 embodiment. That is, from a pressure source (not shown), air, inert gas or other suitable pressurized fluid, is introduced through a conduit 88 into the cooking chamber 52 and a valve 90 in the conduit 88 is manually operable to permit the introduction or release of pressure to or from the cooking chamber 52.

A second rapid cooling means, generally designated 100, comprising a spray conduit 102 having a plurality of orifices 104 from which a spray of liquid coolant such as 40° F. water, liquid nitrogen, supercooled nitrogen vapor or the like, can be directed upon food 92 supported in the cooking area 60. A conduit 106 provides means through which the coolant may be introduced into the spray conduit 102 and has associated therewith a manually operable valve 110 for controlling the flow from a coolant source into said spray conduit. Inasmuch as the cooked product is not submerged within a liquid cooking medium, such as hot water, oil or molten fat, the cooling means described herein effectively and efficiently operates to rapidly reduce the temperature of the cooked product and particularly the surface thereof to thereby obtain the ends described herein. The spray conduit 102 may be provided in the embodiment of FIG. 1 in combination with the cooling means shown therein for use together therewith or independently thereof, the essential purpose thereof being to effect rapid surface cooling, reduction of the temperature internally of the cooked product and the arrestment of the cooking phase, such being essential in carrying out the precepts of the process described herein.

Figure 5:
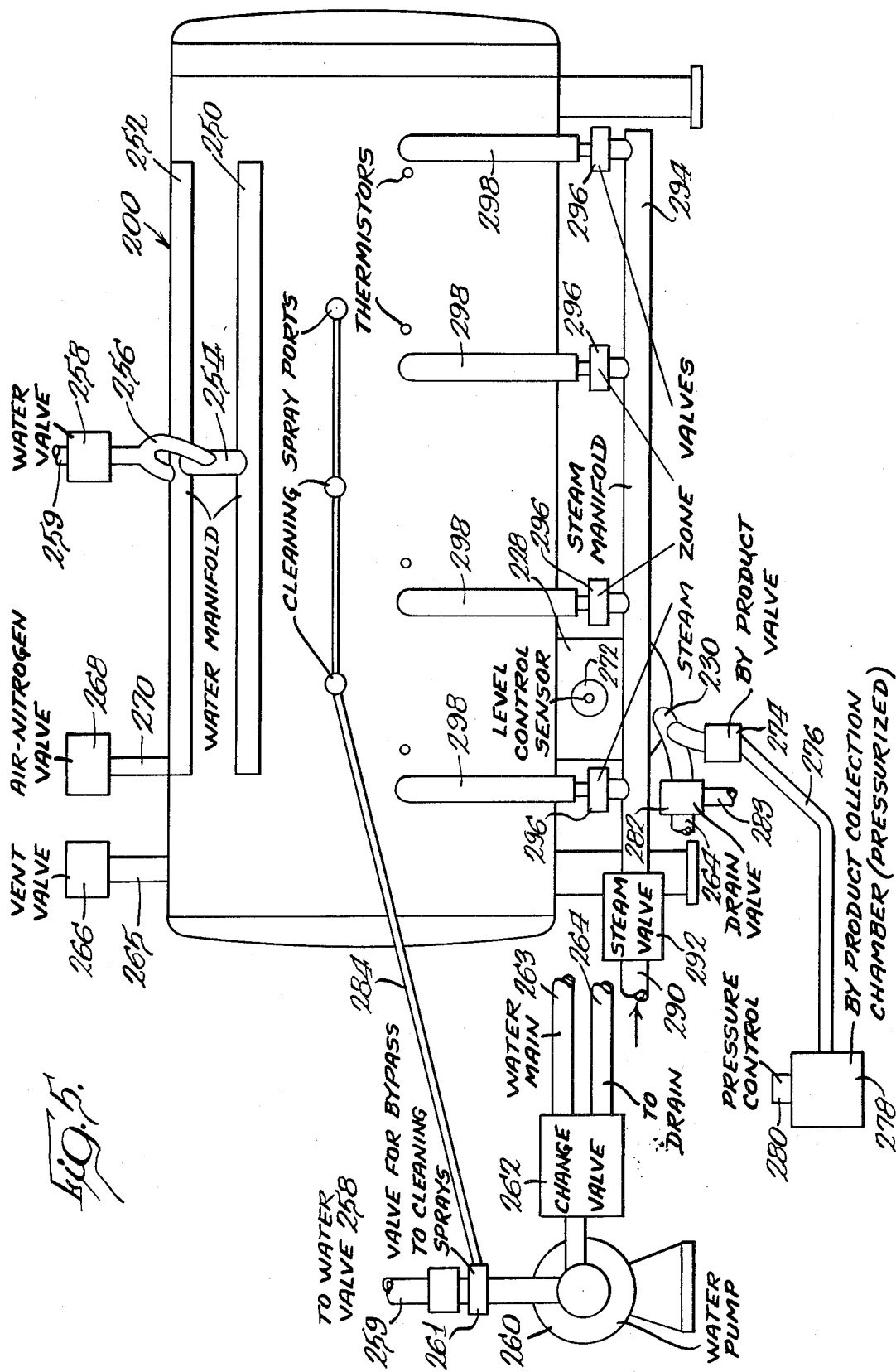
FIG. 5 is a side elevation in schematic form of the apparatus illustrated in FIG. 3 showing various mechanical control features.
Figure 6:
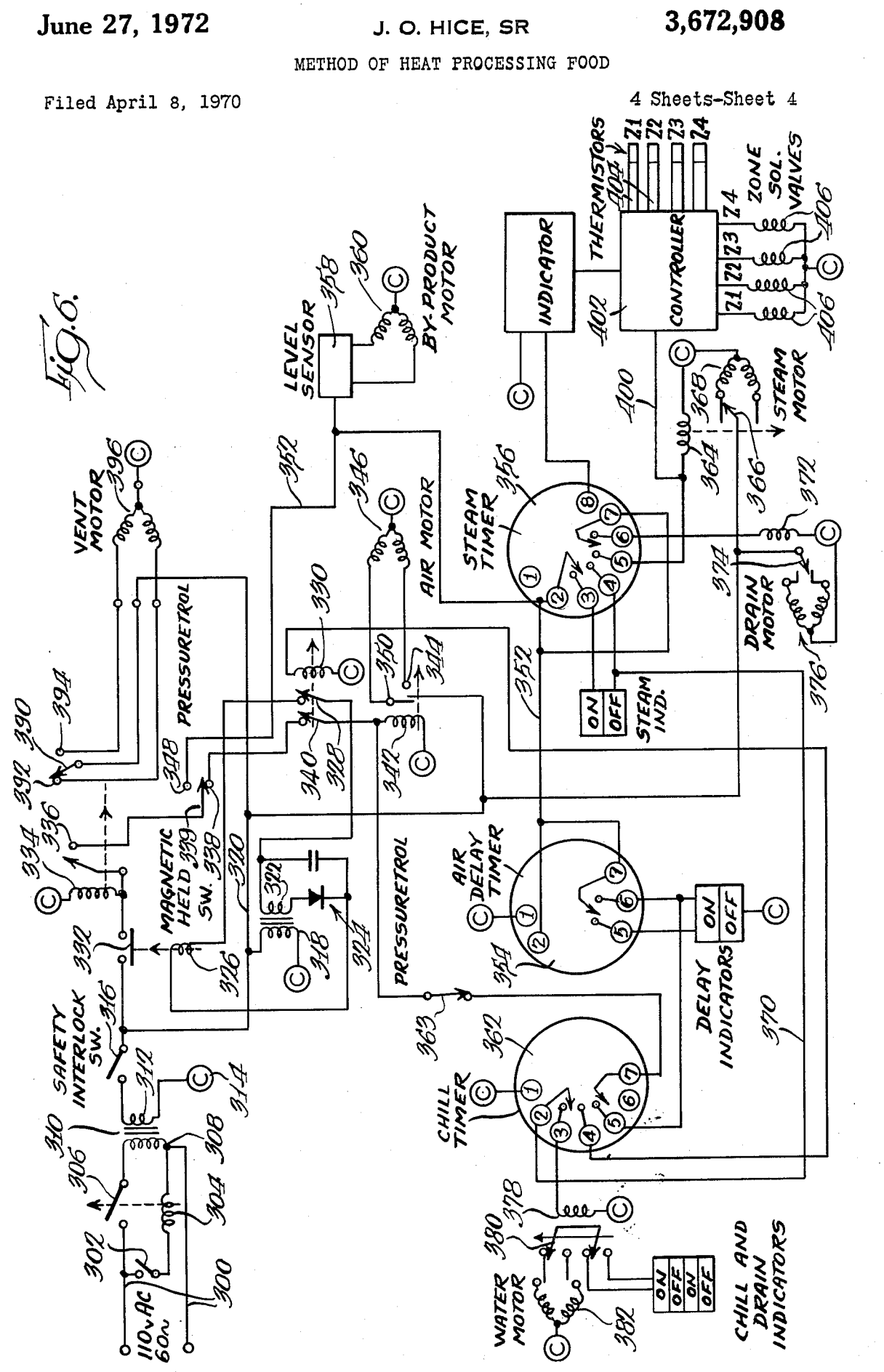

A more elaborate form of apparatus especially adapted for practicing the inventive method is illustrated in FIGS. 3-6, with FIGS. 3 and 4 illustrating mechanical details and FIGS. 5 and 6 illustrating schematically, control elements.

With reference specifically to FIGS. 3 and 4, the apparatus is seen to include a pressure vessel generally designated 200 comprised of a cylindrical body 202 capable of withstanding the operating pressures encountered in the process. One end of the cylindrical body 202 is closed by hemispherical end wall 204 while the other end is closed by a hemispherical door member 206.

The cylindrical shell 202 has externally secured thereto a door mounting plate 208 which in turn mounts a pair of horizontally spaced plates 210 each bearing aligned collars 212 which receive a pivot pin 214 for the door 206. The door 206 has secured to its external surface, a pair of horizontally spaced plates 216 which also mount aligned collars 218.

As can be seen in FIG. 3, the pivot pin 214 extends between the collars 212 and journals the collars 218 so that the door member 206 can pivot about the vertical axis provided by the pin 214.

When the vessel is of extremely large size, it may be desirable to provide a motor for operating the door 206 and to this end, the same may include a mounting element 220 offset from the vertical axis of the pin 214 which may be pivotally connected to the rod 222 of a hydraulic cylinder (not shown).

Finally, to complete the door structure, there is provided a conventional locking ring 224 which preferably is hydraulically actuated and may include various switch operating means for insuring that the processing of material within the vessel 200 cannot take place except when the locking ring 224 is in a fully locked position.

The vessel 200 may also include depending legs 226 to support the same on any suitable surface. Furthermore, depending from the underside of the vessel 200 is a sump well 228 which has its lower end terminating in a conduit 230 through which fluid accumulating in the vessel 200 during processing may be withdrawn.

Internally of the vessel 200 and near the lower end on opposite sides of the vertical centerline of the vessel, a pair of condensate collecting baffles 232 are located. As will be seen, heat to the contents of the vessel 200 is provided by free steam and accordingly, there will be some condensation of the same. When the condensation occurs on the internal surface of the shell 200, the same will run downwardly until it encounters baffles 232 to then be directed rearwardly towards the hemispherical member 204 which may be provided with a suitable collection opening and pressure retaining valve (not shown). The use of the baffles 232 minimizes the intermingling of condensate from the steam and fluids exuded by food contained within the vessel during the treating process so that such fluids, as they are collected in the sump well 228, will not be substantially diluted by steam condensate.

Near the lower extremity of the vessel and symmetrically located about its vertical centerline are a plurality of steam jets 234. The steam jets 234 are longitudinally equally spaced along the length of the vessel. Just below the horizontal midpoint of the vessel and again symmetrical with respect to the vertical centerline of the vessel, is a second set of steam jets 236 which also are equally spaced longitudinally along the length of the vessel and are in the same vertical plane as corresponding ones of the stem jets 234.

On the left-hand side of the vessel as viewed in FIG. 4 and located intermediate the steam jet 234 and 236 and just above the baffle 232, are a plurality of thermistors. the number of thermistors 238 corresponds to the number of vertical planes encompassing corresponding steam jets 234 and 236 so as to define a plurality of heating zones. In order that steam emitted from the left-hand jet 234 in each zone does not cause an erroneous reading by the corresponding thermistor 238, each thermistor 238 is offset from the vertical plane encompassing the corresponding jets 234 and 236 a short distance as, for example, six inches.

At the midpoint of the vessel on the left-hand side thereof, there is provided a sight port 240 so that the contents of the vessel may be observed during the processing thereof. In order to illuminate the contents, a light port 242 is also located on the left-hand side of the vessel above the sight port 240. A light source (not shown) may be associated with the light port 242 so as to illuminate the interior of the vessel.

Just above the horizontal midpoint of the vessel, there may be located a plurality of jets 244 through which a cleaning solution for the interior of the vessel may be introduced. And, just above the cleaning solution jets 244, is a first set of jets 246 through which a coolant such as cooling water may be introduced into the interior of the vessel. The vessel is also provided, near the top thereof, with a second set of jets 248 through which additional cooling fluid may be introduced.

As will be apparent from an examination of FIG. 3, the number of jets 246 and 248 for the introduction of coolant are greater than the number of jets 234 and 236 for the introduction of steam. This is to insure that coolant will be well distributed throughout the vessel during the cooling phase of the processing. Of course, the number of steam jets and coolant jets can be varied dependent upon the physical dimensions of the vessel as desired.

Finally, a tram rail 249 is secured to the interior of the vessel at the upper center thereof. The tram rail 249 is adapted to support food supports within the vessel as well as to facilitate the loading and unloading of food supports.

Turning now to FIG. 5, various mechanical control elements employed with the vessel paritcularly adapted for assisting the practice of the inventive process are seen. The control elements include two pairs of coolant distribution manifolds 250 and 252 (only one manifold of each pair is shown) associated with the jets 246 and 248 respecstively. The manifolds 250 and 252 are interconnected by a conduit 254 which are in turn connected by means of a conduit 256 through a motor operated valve 258 to a source of coolant such as cold water. The manner in which the valve 258 is operated will be described hereinafter.

The water valve 258 is provided with coolant water from a conduit 259 connected to the output side of a water pump 260. Interposed between the pump 260 and the conduit 259 is a by-pass valve 261 for purposes to be seen. The water pump 260 receives inlet water from a valve 263 which may connect the pump either to a water main 263 in an existing system or to a conduit 264 which may be connected to the drain of the vessel as will be seen.

Also provided is a conduit 265 communicating with the interior of the vessel and a motor driven vent valve 266 which may be opened to vent the contents of the vessel to atmosphere or closed to maintain pressure within the vessel.

To provide a gaseous atmosphere under pressure within the vessel, there is provided a motor driven valve 268 which may be connected to a pressure source such as an air compressor or a source of compressed nitrogen and which, when opened, will permit the application of gaseous atmosphere under pressure to the contents of the chamber through a conduit 270 interconnecting the valve 268 and the interior of the chamber.

The sump well 228 is provided with a conventional level sensor 272 which is associated by means to be seen hereinafter with a motor driven by-product valve 274 which may be opened to permit fluids exuded from the food during processing to pass from the sump well 228 through a conduit 276 to a collection chamber 278. The chamber 278 may also be provided with a conventional pressure control 280 which regulates the pressure in the chamber 278 to a level less than that within the chamber during processing. As a result, when the fluids are permitted to pass to the chamber 278 by the opening of the valve 274, the sudden entry into the lower pressure zone of the chamber 278 will cause the flashing away of some of the water mingled with the exuded fluids by flash evaporation. The chamber 278 may be provided with one or more drain valves (not shown) through which collected juices may be withdrawn.

A second outlet from the sump well 228 includes a drain valve 282 which is operable to either discharge fluid accumulating in the sump to a drain through a conduit 283, as will generally be the case during the cooling step of the inventive method if cold water is used as a cooling fluid, or to return the fluid to the conduit 264 for purposes to be seen.

Returning to the by-pass valve 261, the same is associated with a second conduit 284 which is in fluid communication with the cleaning spray ports 244. As a result, when the valve 261 is thrown into a by-pass position, the pump 260 will be operative to deliver a cleansing fluid to the interior of the chamber through the spray cleaning ports 244.

In many instances, it will be desirable to minimize cleaning costs by rising a minimum of a cleaning solution by recirculating the same. Accordingly, when such is desired, the valve 261 may be shifted to the cleaning position of the same and the valve 262 may be arranged to provide the pump 260 with fluid received in the conduit 264. The valve 282 is then arranged so as to convey fluid communicating in the sump well 228 to the conduit 264 to complete the recirculation path whereby the cleansing fluid may be continually reused until the vessel is cleaned.

A second recirculation path employing the sump well 228, the outlet conduit 230 therefrom to the valve 262, the pump 260, the by-pass valve 261, the conduit 259, the water valve 258, the conduits 254 and 256 and the coolant manifolds 250 and 252 may also be employed for basting purposes during an actual food processing operation. Specifically, fluids exuded from the food during processing will collect in the sump in the manner mentioned previously and through the just-mentioned recirculation path, may be directed to the coolant spray ports 248 to be discharged upon the food in the chamber to baste the same.

In order to heat the contents of the vessel, a conduit 290 may be connected to any suitable source of steam under pressure. Steam received within the conduit 290 has its flow controlled by a main steam valve 292 which, when open, will permit steam to flow to a main steam manifold 294. The main steam manifold 294 is, in turn, connected to a plurality of steam zone valves 296 equal in number to the number of zones employed in the apparatus and which, as will be seen, are individually controllable in accordance with the temperature in the associated zone. Each of the steam zone valves 296 in turn connects with a respective zone manifold 298 which is in fluid communication with each of the steam openings 234 and 236 in the associated zone.

Turning now to FIG. 6, the manner in which the various valves are controlled so as to enable the practice of the inventive process within the chamber will be described.

Power for operating the control system may be received on lines 300 which have a manually operable switch 302 connected across the same in series with the coil 304 of a relay. The relay coil 304 may be energized upon the closing of the switch 302 to close normally open contacts 306 thereof to energize the primary 308 of an isolation transformer 310 when the process is to be initiated. Power induced in the secondary 312 of the isolation transformer is then used to operate the remainder of the control system.

One side of the secondary 312 is connected to a "common" terminal 314 while the other is connected to a normally open safety interlock switch 316 which may be arranged to be cam operated to a closed position by the locking ring 224 (FIG. 3) of the unit when the unit is tightly closed. The closing of the switch 316 also provides power to the primary 318 of a step down transformer 320. The secondary 322 of the transformer 320 is connected to a half-wave rectifying and filtering circuit, generally designated 324, which in turn, is connected to one side of a magnetic hold relay coil 326. The other side of the coil 326 is connected through the normally closed contacts 328 of a relay 330 and returned to the secondary 322.

As a result, when the relay 330 is deenergized (the normal condition throughout a processing cycle), the manually operable switch 312 closed and the safety interlock switch closed, power from the secondary 312 of the isolation transformer 310 will be applied through contacts 332 operated by the magnetic hold relay 326 to energize a relay 334. The relay 334 includes normally open contacts 336 and by virtue of its energization, the contacts 336 will then close. The closing of such contacts results in the application of power to the normally closed contacts 338 of a low pressure operated switch 339, normally closed contacts 340, also operated by the relay 330 to energize a relay 342. The energization of the relay 342 will then cause the same to apply power through a contact 334 to energize one winding of a control motor 346 for the air valve 268 (FIG. 5). This will cause the vave 268 to open to admit air to the vessel for prepressurization purposes with the pressure setting of the switch 339 controlling the prepressurization pressure as will be seen.

When the air pressure within the vessel has reached a predetermined prepressurization pressure, the low pressure operated switch 339 will open through contacts 338 and close through contacts 348 thereof. The resultant breaking of the circuit to the relay 342 will cause the same to revert to its deenergized condition so that power will be applied through a contact 350 to the other winding of the motor 346 thereby causing valve 268 (FIG. 5) to close to cease the flow of air under pressure to the interior of the vessel. This action will complete the prepressurization step of the inventive method alluded to generally previously.

The closing of the low pressure switch 339 through the contacts 348 will then provide power to a line 352 connected to the #2 terminals of both an air delay timer 354 and a steam timer 356, both of conventional construction.

The same connection also provides power to a level sensing circuit 358, of conventional construction, which controls a bidirection motor 360 associated with the by-product valve 274 (FIG. 5). The level sensing circuit 358 acts to permit the draining of by-products through the valve 274 whenever the level of the sump well 228 (FIG. 5) exceeds a predetermined level and to preclude such drainage whenever the predetermined level is not exceeded.

Returning to the timers 354 and 356, the application of power to the timer 354 along the line 352 will cause the same to cycle and as it completes its cycle, an internal switch normally closed through terminal #5, will close through terminal #6 to apply power to terminal #5 of the chill timer 362. At this time, a switch internally of the chill timer 362 and associated with terminal #7 thereof will be closed to terminal #5 to apply power through a high pressure control switch 363 to the relay coil 342. If the pressure in the vessel is below a predetermined total pressure desired for the heat treating phase of the process after the air delay timer 354 has run through its cycle, the relay 342 will again be energized to energize the air valve controlling motor 346 to admit more air under pressure to the interior of the vessel in the manner mentioned previously. However, if the pressure in the vessel is at or exceeds the total pressure desired for the process, the high pressure control switch 363 will be opened so that the relay 342 cannot be energized to cause the admission of more air. Of course, if during the process, pressure fluctuates within the vessel both above and below the predetermined total pressure, the switch 363 may open and close to intermittently cause the relay 342 to ultimately open the air valve to admit more air.

With the application of power to the steam timer 356 as mentioned previously, the same will begin its cycle. Throughout the cycle of the steam timer 356, terminal #5 thereof is connected through an internal switch to terminal #7 which is connected to the line 352 to provide power to a relay coil 364. The relay 364 operates contacts 366 associated with a bidirectional steam valve controlling motor 368. The arrangement is such that upon the application of power on line 352, the motor 368 will be energized to drive the main steam valve 292 (FIG. 5) to an open position so that steam will be available in the manifold 294 (FIG. 5) and may be admitted to the vessel itself if any one of the zone steam valves 296 (FIG. 5) are open for the heat treating phase of the process.

As the steam timer times out, power will be applied to terminal #4 thereof and along a line 370 to the chill timer 362 to cause the same to initiate its cycle. Simultaneously, power will be supplied through terminal #6 of the steam timer to a relay coil 372 associated with contacts 374 which control a bidirectional drain valve control motor 376 associated with the drain valve 282 (FIG. 5). Also, power will be removed from terminal #5 of the steam timer 356 to thereby energize the relay 364 which will then cause the steam control motor 368 to drive the main steam valve 292 (FIG. 5) to a closed position to terminate the heat treating phase.

The energization of the chill timer 362 will cause the energization of a relay coil 378 which drives contacts 380 associated with a bidirectional chill water control motor 382. The motor 382 is associated with the water valve 358 so the same will open to ultimately cause chill water to be sprayed upon food within the vessel to initiate the cooling phase of the process. Deenergization of the relay coil 378 will result in the water valve 358 returning to a closed position.

It will be recalled that virtually simultaneously with the opening of the water valve 258, the drain valve control motor 376 was caused to open the drain valve 282. As a result, the chill water accumulating in the vessel may drain from the sump well.

During the chilling, pressure is maintained in the vessel through the energization of the relay 342 and the high pressure control switch 363 connected to the chill timer 362. However, steam will not be admitted to the vessel at this time because when the steam timer timed out, relay 364 was deenergized to cause the steam control motor 368 to close the main steam valve 292.

When the chill timer 362 has timed out, the internal switch thereof interconnecting the terminals #5 and #7 will open to thereby deenergize the relay 342 ultimately causing the air valve 268 to return to a closed condition. Additionally, another internal switch will move from terminal #3 of the chill timer to terminal #4 thereof thereby deenerziging the relay 378 to ultimately cease the flow of cooling water to the interior of the vessel thereby terminating the cooling phase. The movement of the last-named internal switch of the chill timer 362 to terminal #4 will cause the allocation of power to the relay 330 to cause the same to be energized. As a result, contacts 328 and 340 thereof will be opened. The opening of the contacts 328 release the magnetic hold relay 326 while the opening of the contacts 340 preclude the energization of the relay 342 as pressure within the vessel is decreased so that the air valve 268 cannot be energized when the low pressure control switch 338 again closes during the decrease of pressure in the vessel.

The deenergization of the magnetic hold switch 326 will result in the contacts 332 operated thereby opening to deenergize the relay 324. The relay 334 additionally controls a switch 390 movable between contacts 392 and contacts 394. The contacts 392 are connected to one winding of a bidirectional vent control motor 396 while the contacts 394 are connected to the other winding of the motor 396.

When the relay 334 was initially energized at the beginning of the cycle, the switch 390 was closed through the contact 394 to apply power to the vent motor 396 in such a way that it would drive the vent valve 266 (FIG. 5) closed to permit pressure to build up within the vessel. However, when the relay 334 was deenergized in the manner just mentioned, the switch will revert to its normal condition, namely, closed through contact 392, to apply power to the other winding of the vent motor which will respond thereto and drive the vent valve 266 to an open position. As a result, the pressure within the vessel is premitted to escape through the vent valve 266, generally at a slow rate, as for example, at a rate of about six pounds per square inch per minute, to cause the depressurization phase to occur.

It will be recalled from the description of FIGS. 3 and 5 that the admission of steam to the interior of the vessel for heating purposes is controlled in such a way as to regulate the temperature in the various zones within the vessel. Returning to the steam timer 356, it will be seen that when power was applied thereto along the line 352, and the same was directed through terminal #7 and the internal switch to terminal #5 to energize the relay 364, power is also provided along a line 400 to a conventional controller 402. Associated with the controller 402 are a plurality of thermistors 404 located in the vessel as mentioned previously which sense the temperature in an associated zone. The controller also has associated therewith a plurality of solenoid valve operators 406 which operate the steam zone valves 296. By means of conventional connections, the controller 402, thermistors 404 and the solenoid operators 406 are arranged so that steam may be admitted to any zone whenever the associated thermistor senses that the temperature in that zone is less than a predetermined temperature as determined by the setting of the controller 304. The controller 304 will then operate the associated solenoid valve operator 406 to open the associated zone steam valve 296. When the temperature in that zone again has been elevated to the predetermined level, the associated zone valve 296 will again be closed.

As will be seen in the description of the inventive method hereinafter, various process parameters are employed depending upon the product being processed. Accordingly, to facilitate maximum flexibility of the apparatus, it is desirable that the timers 354, 356 and 362 be adjustable so that the period of each operation may be appropriately adjusted. Similarly, it is desirable that some provision for adjustment be made in the controller 402 so that the temperature may be selectively controlled. Finally, it is desirable that the pressure switches 338 and 363 be dajustable to control prepressurization pressure and total system pressure respectively as desired.

It will be appreciated futrher than the presently disclosed cooking treatment can be accomplished in a continuous system, i.e., wherein moving conveyor means are utilized for the purpose of carrying the food product thorugh an apparatus wherein temperature and pressure is independently controllable, wherein rapid cooling can be effectuated and wherein the food product is maintained in a gaseous atmosphere throughout its movement through the system. Upon completion of the treatment, the food product can be directly deposited into a cooler or freezer unit and held therein pending distribution, marketing or storage thereof.

In carrying out the improved cooking process, the raw moist food product is placed in the cooking apparatus as shown in the accompanying drawings and superatmospheric pressure is applied within the cooking chamber from an external pressure source. According to one embodiment of the invention, the prepressurization and cooking pressures are at least 45 p.s.i. The temperature within the chamber is then raised, the source of heat being any suitable direct or indirect means such as, e.g., steam (free or jacketed) as illustrated herein, quartz, microwave, electronically induced heat, heated water under pressure, or the like. Generally, the temperature will be raised to at least 150° F.

As shown, the food is supported upon rack or platform means designated herein as the cooking area, said means being effective in maintaining the food above the liquid heating medium if there be one as shown in FIG. 1 of the drawings and to allow the cooling spray as shown in FIG. 2 to, where the coolant is cold water, rapidly drain from the product in order to effectively accelerate chilling of the surface of the food following the cooking phase. Of singular import, however, is the maintenance of the food product in a gaseous environment during the prepressurization and cooking phases. In this manner, the degree of cooking shrink has been found to be unexpectedly minimized with an attendant maximization of the retention of the nutritional and flavor imparting ingredients of the food.

Heat sources such as hot oils or fats which may be employed in deep fat cooking, e.g., or otherwise utilized as the source of heat in known cooking processes, are rather poorly adaptable in carrying out the cooking precepts advanced herein, particularly because of their high specific heat characteristics; a desideratum of the present process being the rapid and further heating and the rapid removal, therefore, of any residual heat upon termination of a predetermined cooking period. In furtherance of this end, the importance of utilizing heat sources which can be quickly removed from finalization of the cooking phase is, therefore, emphasized.

Concurrently with or immediately following removal of heat from the cooking chamber, the temperature of said chamber is quickly lowered preferably to room temperature while the pressure within the chamber is maintained, at least during the early stages of this cooling procedure, return of said chamber to atmospheric pressure being accomplished gradually to preclude explosion of the cooked food.

Subjection of the food, prior to the application of cooking heat thereto, to superatmospheric pressures effects pressurization of the natural food moisture entrained within the cellular complex of the food thereby raising the boiling point of such moisture to minimize evaporation thereof during the subsequent rise in temeprature occasioned upon application of heat to the cooking chamber. That is, as cooking heat is applied, the already increased boiling point of the food fluids preclueds substantial evaporation of the same whereby the fluids are substantially retained in the product resulting in a higher yield. Additionally, the hot fluids thus retained deeply within the food during the cooking phase greatly preserve the flavor and nutritional values of the finished product.

Where, however, cooking heat and superatmospheric pressures are applied simultaneously, substantially greater vaporization of food moisture is noted in the initial stages of the cooking process, such phenomenon being apparently due ot the lag in the rise of the boiling temperatures of the innermost fluids notwithstanding the application of pressure surfacedly of the food.

Rapid cooling of the product has also been found extremely effective in inhibiting exudation by reason of the contraction of the pores or cells disposed surfacedly of the food to thereby seal to a great extent these escape avenues of the entrained fluids. According to one embodiment of the invention, rapid cooling of the cooked food so that the surface temperature thereof is lowered below 100° F. is effected in less than four minutes.

Whether it be cold water or liquid nitrogen, e.g., which is introduced in a jacketed area 58, or conventional refrigerant expanding in the coils 34 of the FIG. 1 apparatus, or a cold water spray, e.g., as permitted by the apparatus illustrated in FIG. 2, it will be observed that an advantage achieved by any of these cooling methods is the effectuation of rapid return of the food to temperatures below the critical temperature range of 70–100° F. prior to the removal of the food from the cooking apparatus, said temperature range being most conducive to bacterial growth. Accordingly, by minimizing the time during which the food is allowed to remain in the critical temperature range bacterial growth is substantially retarded. Further, where reversal of the temperature cycle is effectuated by the utilization only of cold water or liquid nitrogen, e.g., circulated through jacketed area 58, or conventional refrigerant expanding in the coils 34 of the FIG. 1 apparatus, the maintenance of sterile conditions within the cooking chamber throughout the rapid cooling phase will be achieved. That is, where non-sterile coolant is not permitted to contact the food, bacterial growth would be entirely prevented.

The inventive method of processing food, in its most advantageous form, is comprised of the following steps: (1) Applying pressure to the food in a gaseous atmosphere prior to the application of heat thereto, (2) applying heat to the food while maintaining the pressure, (3) rapidly cooling the food, and (4) releasing the pressure applied to the food.

In addition, other steps may be included. For example, the step of prepressurization may be followed by and the step of applying heat may be preceded by the provision of a short time lag. Also, the step of applying heat to the food may be followed by and the step of cooling the food may be preceded by a time period that permits the internal temperature of the food to "coast" upwardly as heat is transferred from the higher temperature outer layers of the food to the lower temperature innermost layers. Finally, there can be some overlap in the cooling step and depressurization step. That is, it is not necessary to wait until the food is fully cooled to the desired temperature before initiating the depressurization step.

The basic purpose of the prepressurization step is to raise the boiling point of the liquids contained within the food prior to the application of heat to thereby minimize the rate at which such liquids evaporate during subsequent heat treatment. This step is normally accomplished by subjecting the food to be processed to air or an inert gas, such as nitrogen, under pressure and is maintained during the heat processing step in such a way as to minimize evaporation of the liquids contained within the food during heat treating.

More specifically, the liquids within a food are generally water based and therefore, their boiling temperature will be approximately that of saturated stream at a given pressure. By applying and maintaining a pressure in excess of the pressure of saturated steam at the processing temperature, evaporation of the liquid within a food is minmized. Stated another way, if the pressure is maintained such that the temperature applied to the food during the subsequent heating step is significantly lower than the boiling point of water at the process pressure, the vapor pressure of the liquid within the food will be but a fraction of the total system pressure and evaporation will occur at a much lower rate than would be the case if the system temperature were equal to the saturated steam temperature corresponding to system pressure.

The optional step of providing a short time lag between the step of prepressurization and the step of applying heat tends to permit some equalization of internal food pressure with applied pressure for the same purpose as the prepressurization step. Specifically, it is believed that the time lag permits some pressurization of the innermost parts of the food to raise the boiling point of the liquids in such innermost parts to minimize evaporation. However, because in practice the step of applying heat requires a finite time, particularly when the processing apparatus is of relatively large size, the provision of a lag is not particularly critical and may last only a few seconds.

The step of applying heat to the food may be accomplished by any of several means. One means that has proved particularly practicable is the application of free steam to the food within the cooking temperature. However, the heat of the food may be accomplished through the use of various heating means heretofore known including microwaves, etc.

Regardless of the means by which heat is applied to the food, it is desirable that the temperature of the atmosphere never reach a temperature corresponding to the saturated steam temperature at system pressure; or, if microwave heating is used, it is desirable that the temperature of the food never reach a temperature corresponding to saturated steam temperature at the system pressure.

The purpose of this limitation on heat treating is to minimize the rate of evaporation of liquid within the food by maintaining the vapor pressure of such liquid materials at a lower pressure than the total system pressure as mentioned previously.

According to one preferred embodiment of the invention, the application of heat is accomplished through the use of free steam. When free steam as a heat source is considered in conjunction with the prepressurization step, it will be recognized that the food is subjected to a steam and air or inert gas mixture. As a result, the total system pressure will be made up by the partial pressure of the air or inert gas, the partial pressure of the steam and the partial pressure (relatively negligible) of the liquids within the food. Accordingly, the temperature of the atmosphere in which the food is processed will bear a relation to the partial pressure or mole fraction of the steam in the atmosphere to the total pressure and will be less than the temperature of saturated steam at the total system pressure dependent upon the relation between mole fractions or partial pressures of the steam and air.

This procedure provides a number of advantages. The first will be apparent from the foregoing discussion of the prepressurization step and the heat application step, namely, because the system temperature will be less than the temperature of saturated steam at total system pressure, the rate of evaporaion of liquid within the food will be significantly retarded. Secondly, a relatively rapid, low temperature heat processing step results. Specifically, as is well known in the food treating arts, processing of food proceeds at a more rapid rate as the pressure applied to the food is increased. However, if free steam alone is used as a source of both heat and pressure as is the case in many conventional processes, the temperature at which the food is processed necessarily must increase with pressure. In some cases, this will result in the food being subjected to a sufficiently high temperature that it becomes "over-processed" even though the associated pressure might be the optimum as far as the process rate is concerned.

For example, if an optimum process pressure was determined to be 70 p.s.i.g. and free steam was to be used as the heating medium and the pressure applying medium, the temperature applied to the food would of necessity be approximately 316° F. minimum which is the temperature of saturated steam at 70 p.s.i.g. Of course, if superheated steam were to be used, then the temperature would be even higher.

But, by using an air-steam mixture, according to this invention, a processing pressure of 70 p.s.i.g. may be easily obtained along with significantly lower process temperatures as, for example, 230° F. by appropriately adjusting the mole fractions of steam and air in the processing environment.

Of course, the same advantage can be obtained using heat sources other than free steam. For example, an electrical heating unit could be employed and regulated such that the environmental temperature in the processing area is less than the temperature of saturated steam at the process pressure. However, in such a case, it may be desirable to provide for humidification of the processing area to retard moisture loss.

As mentioned previously, an optional step may be employed between the heat applying step and the cooling step. For example, if it be considered that processing of a particular food such that an internal temperature of 155° F. be reached at the centermost point in the food, the step of applying heat to the food may be terminated when the centermost part of the food has reached 145° F. This may be followed by a time lag say, for example, ten minutes, during which heat from the outermost layers of the food continues to be transferred toward the innermost layers to bring the centermost part up to the desired 155° F. This optional step has the advantage of minimizing "overprocessing" of the outermost layers of the food in attempting to assure minimum processing of the centermost part of the food to thereby yield a more uniform product. Furthermore, if desired, once the temperature in the innermost layers has coasted up to the desired internal temperature, the food may be maintained in the processing area with an applied temperature equal to the desired internal temperature for a given time for tenderization purposes. That is, the food may be held at the final desired temperature prior to cooling to facilitate tenderization at a cooking temperature but without further cooking the food.

The step of cooling the food may be accomplished by any of the various means hereinafter stated. One of the most practical means from a commercial standpoint is by spraying, fogging, or immersing the food in cold water while the same is under pressure. The step of cooling, like the step of prepressurization, minimizes evaporation of liquids contained within the food.

For example, say the food were processed to a temperature of about 212° F. under significant pressure as mentioned previously. Because the food would be subjected to such pressure, the rate of evaporation of moisture contained therein would be relatively low. However, before the food may be put to use, it must be released from the pressurized atmosphere and if the food were at the final process temperature of 212° F. when pressure were released, suddenly the partial pressure of the moisture within the food would be equal to the total environmental pressure and rapid evaporation would take place. Such rapid evaporation would, of course, result in the loss of a significant portion of the liquids within the food and could result in a literal explosion if the rate of evaporation from the innermost parts of the food is sufficiently rapid.

Therefore, by cooling the food before the release of pressure from the same, when the food is again subjected to atmospheric pressure, it will be at a temperature sufficiently low that rapid evaporation will not take place. Normally, the cooling step should take place until the surface temperature of the food is no higher than 100° F.

The cooling step also serves to rapidly arrest cooking so that the food will not be overprocessed.

Furthermore, when the food being processed contains fat, and the cooling is accomplished using a free cooling agent (such as cold water) within the processing area, fat on the surface of the food immediately coagulates to seal the food surface to preclude exudation of juices.

Finally, when a free cooling agent is used, seasonings may be mixed therewith prior to application to the food to season the food during cooling.

Finally, following the cooling of the food, the pressure may be released from the same. Normally, the release of pressure should proceed at a relatively low rate. This is due to the fact that during the processing of the food at the elevated pressure, pressure within the cells comprising the food will ultimately equalize with total system pressure and if system external pressure were released suddenly, an explosion may result. However, in some cases, it may be desirable to make use of this phenomena, as, for example, in de-boning fish or poultry. In such a case, the meaty material would actually be blown off of the bones upon the sudden release of pressure.

There can be some overlap in the depressurizing step and the cooling step if overall process time should, for any reason, be minimized. However, when there is an overlap, the rate of pressure release must be made such that there is always a greater pressure applied to the food during the cooling than the partial pressure of the liquids within the food to preclude the rapid evaporation mentioned previously.

The foregoing method has a number of advantages as follows. Firstly, because the method significantly increases the retention of moisture within the food, the overall yield of the process is significantly greater than that obtainable with conventional processes to provide a substantial economic benefit. For example, a conventional process of cooking chicken will normally yield about 86 pounds of cooked chicken for each 100 pounds of raw chicken processed. However, if 100 pounds of raw chicken are processed by the inventive method, on the average, 93 pounds of processed chicken will result. As a result, the processor has 7 more pounds of chicken per 100 pounds of raw chicken to purvey with the same raw material cost.

Secondly, because of the increased retention of moisture, many of the flavoring constituents in the food are retained to an extent significantly greater than would be the case if the food were conventionally processed thereby yielding a more tasty and succulent product and one that is more marketable.

Thirdly, because the process combines the advantages of rapid processing rate through the use of pressure and low temperature processing to avoid "overprocessing" of the food, the process may proceed at an economical pace without damaging the outermost layers of the food due to prolonged exposure to high temperatures as is the case with many conventional processes performed at the same pressures. Thus, in the case of meat and poultry products, the outer layers of the food tend to be much more tender to again yield a more marketable product.

The following working examples and tables illustrate both process parameters for various types of foods and in some cases, illustrate the sizable yield advantages obtainable through the use of the process.

A mass of freshly cut up pieces of chicken weighing 400 grams was placed upon the cooking area 60 of an apparatus similar to the one illustrated in FIG. 2 of the drawings. The door 56 was closed and a pressurized air source was introduced into cooking chamber 52 via conduit 88 until a pressure value of 50 p.s.i. was attained within said chamber. Valve 90 was then closed and steam introduced into jacket 58 in order that a cooking temperature of approximately 225° F. was established within said cooking chamber 52. The temperature of the chamber rose from approximately 100° F. to 225° F. in approximately four minutes. The pressure rose from 50 p.s.i. to approximately 60 p.s.i. when the temperature reached 225° F. During the period required for the chamber temperature to rise, the pressure differential internally and externally of the chicken became equalized. After 12–18 minutes, the internal temperature of the chicken reached 180° F. and the cooking stage was then completed. Further cooking was at once arrested by promptly curtailing further introduction of steam to jacket 58, releasing the steam pressure from said jacket through conduit 82 and thereafter by immediately introducing and circulating cold water (at 40° F.) into said jacket through conduit 74 and by spraying 40° F. water from orifices 104 onto the cooked pieces of chicken. As a result of such cooling procedures, the temperature of the cooking chamber was rapidly and substantially reduced, the internal temperature of the chicken was quickly lowered to 150° F. and the external surface temperature thereof was rapidly dropped below 70° F. The chamber pressure was maintained throughout the cooking and chilling period and once the surface temperature of the chicken was accordingly reduced the pressure was slowly released via conduit 88 at a rate of from 10–20 p.s.i. per minute. The pieces of chicken were then removed from the cooking apparatus and weighed to determine the product yield provided by the process. The weight thereof was found to be 372.0 grams thus indicating a finished product yield of 93.0%, a cooking shrink substantially lower than realized with heretofore utilized cooking procedures.

The following tabulation includes test data representing nine additional cooking operations conducted in accordance with the present invention wherein the moist food consisted of raw cut-up chicken parts, carefully trimmed, without necks and giblets:

| Test No. | Beginning weight (grams) | Cooked weight (grams) | Cooked yield (percent) |
|---|---|---|---|
| 1 | 492 | 405 | 94 |
| 2 | 420 | 382 | 91 |
| 3 | 421 | 396 | 95 |
| 4 | 414 | 393 | 95 |
| 5 | 413 | 384 | 93 |
| 6 | 403 | 370 | 92 |
| 7 | 429 | 405 | 94 |
| 8 | 420 | 382 | 91 |
| 9 | 421 | 396 | 94 |

NOTE.—Average yield=93.22%; Net average loss=6.78%.

In carrying out each of the above nine tests, the pressure environment within the cooking apparatus was begun at 50 p.s.i. prior to the application of cooking heat. The environmental temperature was raised to and held at 215° F., approximately 3½ minutes being required for such temperature build-up and hence the required period of subjection of the chicken to the prepressurizing treatment prior to the actual cooking phase. The cooking phase was carried out in a steam atmosphere. The products in each test were cooked to an internal temperature of 180° F. After cooking, the application of heat was discontinued and the cooked product, still subjected to the aforesaid pressurized environment, was quick-chilled to an internal temperature of 110° F. and to a surface temperature of below 70° F. approximately 3 minutes being required for the chilling operation. Depressurization was then accomplished at the rate of 10–20 p.s.i. per minute.

The surprisingly high average yield of approximately 93% is, as aforementioned, believed in part attributable to carrying out the aforementioned treatment while maintaining the moist food product in a gaseous environment, i.e., pressurized air and steam atmosphere. Tests similar to the foregoing but carried out while the chicken was submerged in boiling water yielded substantially poorer results. That is, maximum yields of approximately 87% were obtained where the chicken product, identical to the product treated in the above tabulated tests, was maintained under water during the prepressurization, cooking and quick-chilling phases.

It is believed that one basis for the surprising yield variation indicated by the comparative tests resides in the fact that oxygen molecules cannot readily combine with or penetrate deeply into the food product unless the latter is maintained in a gaseous environment. That is, the prepressurization step, as aforementioned, is purposeful in raising the vaporization point of the volatiles entrained within the individual food cells prior to the application of the cooking heat, the latter being capable of transfer internally of the food at a rate faster than the oxygen molecules can penetrate into the food to equalize the pressure internally and externally thereof. It has been found that the rate of such pressure equalization is disadvantageously retarded or prevented unless the food product is surrounded by a gaseous atmosphere. Thus, where the food was submerged under water, the gas molecules were, apparently to a large extent, prevented from permeating the cellular food structure, and pressure equalization, therefore, could not properly be accomplished and the high product yield value obtained by practice of the present invention could not be achieved. Rapid or almost instantaneous cooling of the product's surface to temperatures below 70° F. after completion of the cooking cycle could readily be accomplished where the food product was disposed within the gaseous environment, arrestment of the cooking phase and rapid contraction and sealing of the surface of the product being accomplished thereby. Such rapid contraction and sealing is believed extremely instrumental in preventing further loss of entrained moisture following curtailment of the cooking phase. Where further underwater cooking tests were run and rapid cooling was attempted by circulating cold water through or into the hot cooking water, the temperature reduction or reversal of the temperature cycle could not be accomplished with sufficient rapidity to preclude substantial further loss of moisture from the cooked product. Further, substantial losses in product yield were also noted where the temperature of the surface of the product was not quickly reduced below 70° F. Thus, it appears that arrestment of the cooking cycle, although a factor in reducing product moisture loss, fails to preclude optimum moisture loss following the cooking phase. The more important factor in optimizing preclusion of such additional moisture loss appears to reside in quickly sealing in the entrained moisture by rapidly contracting and hardening the surface of the cooked product immediately following the cooking phase. Reduction, therefore, of the surface temperature to below approximately 70° F. advantageously accomplishes this end.

The processing of chicken is generally summarized in the following table:

CHICKEN

| | Optimum | Range |
|---|---|---|
| Prepressure to (p.s.i.g.) | 35 | 15–50 |
| Heat process at— | | |
| Pressure (p.s.i.g.) | 70 | 40–80 |
| Temperature (° F.) | 225 | (¹) |
| Heat process until—Internal temp. (° F.) | (¹) | (¹) |
| Cool to—Internal temp. (° F.) | 100 | ² 130 |

¹ As desired.
² Maximum.

Shrimp and other like moist foods cooked in accordance with the foregoing procedures, similarly undergo far less moisture loss than noted, when cooked by known pressure or non-pressure cooking methods. For example, batches of peeled and deveined shrimp were treated in a manner substantially similar to that described above with respect to the chicken cooking tests. The cooking period ranged between 5–7 minutes in a cooking chamber temperature of 225° F. Cooking was arrested once the internal temperature of the shrimp exceeded 160° F. The cooling phase lasted three minutes, whereafter the air pressure was released at 20 p.s.i. per minute. Several of the batches of shrimp were pretreated in the conventional manner with either a brine or sodium phosphate solution. The average product yield of such pretreated batches ranged between 94% and 97%; the average yield of non-pretreated batches ranging between 90–92%. These results compare with 70–75% yields obtained with heretofore known cooking processes.

Of equal importance, however, is the entirely unexpected observation that shrimp cooked in the gaseous environment as described herein, undergo substantially no shape deformation or "curl." To the contrary, however, shrimp cooked while submerged under water, all other factors conforming with the present teaching, "curled" and otherwise were inferior with respect to color and flavor when compared to those shrimp cooked while not submerged in water.

The processing of shrimp and other like foods such as crabmeat, scallops and clams is generally summarized in the following table:

SHRIMP, CRABMEAT, SCALLOPS AND CLAMS

| | Optimum | Range |
|---|---|---|
| Prepressure to (p.s.i.g.) | 30 | 15–40 |
| Heat process at— | | |
| Pressure (p.s.i.g.) | 50 | 40–70 |
| Temperature (° F.) | 215 | 200–225 |
| Heat process | (¹) | (¹) |
| Cool to—internal temp. (° F.) | (²) | (²) |

¹ 4 minutes or to 160° F. internal.
² 100 or less.

Lobster is cooked in the same manner as shrimp, as set forth above except that it is generally necessary to continue heat processing of the same for approximately 15–25 minutes depending upon the size of the lobster to obtain the desired internal temperature.

Beef is also susceptible to heat processing according to the inventive method as set forth in the following table:

ROAST BEEF

| | Optimum | Range |
|---|---|---|
| Prepressure to (p.s.i.g.) | 40 | 25–55 |
| Heat process at— | | |
| Pressure (p.s.i.g.) | 70 | (¹) |
| Temperature (° F.) | (²) | (²) |
| Heat Process until—internal temp. (° F.) | (³) | (³) |
| Cool to—internal temp. (° F.) | (⁴) | (⁴) |

¹ Minimum.
² 25–30 overdesired internal temperature.
³ As desired.
⁴ 100 or less.

Corned beef and chuck

Corned beef and chuck are processed in the same manner as roast beef except for the following modification to the heat processing step. Heat is applied to the food until the internal temperature thereof reaches 140° F. at which time it is discontinued. The internal temperature of the innermost parts of the product are then permitted to coast upwards to 148° F. and sufficient heat is then reapplied to hold the same at 148° F. for thirty minutes for tenderization purposes. Thereafter, cooling is initiated in the usual manner.

Chuck brisket

Chuck brisket is processed in the same manner as corned beef and chuck except that the holding need only be for twenty minutes.

Outside flats

Outside flats are processed in the same manner as roast beef except for the following modification to the heat treating process. Specifically, the application of heat is stopped when the internal temperature of the product reaches 145° F. and the internal temperature of the innermost parts of the product are then permitted to coast upwards to 155° F. At this time, heat is applied and the flat is maintained at 155° F. for thirty minutes for tenderization purposes.

Fish may also be similarly processed. For example, tuna has been successfully processed as follows:

Tuna

| | |
|---|---|
| Prepressure to (p.s.i.g.) | 30 |
| Heat process at— | |
| Pressure (p.s.i.g.) | 70 |
| Temperature (° F.) | 200–225 |
| Heat process until internal temp. (° F.) | 145 |
| Cool to internal temp. (° F.) | (¹) |

¹ Start when internal temperature reaches 150° and chill to internal temperature of 115° F.

Other meats, such as pork, and vegetables may also be similarly processed.

In the case of pork, the duration of the heat treating phase must generally be of sufficient length to insure thorough cooking.

In the case of vegetables, the heat treating phase is made to last but a few minutes to preclude "overprocessing."

Processing the various foods set forth above in the embodiments of the apparatus illustrated in the figures may be accomplished through manual regulation of the various valves etc., in the case of the forms of the apparatus in FIGS. 1 and 2 or by pre-setting the control components in the apparatus illustrated in FIGS. 3-6. Of course, the forms of the apparatus illustrated in FIGS. 1 and 2 could be equipped with a control system similar to that described in conjunction with the forms of the apparatus illustrated in FIGS. 3-6 if automatic control is desired.

Because the duration of the heat processing and cooling steps will vary depending upon the size and physical geometry of a particular apparatus by which the method is practiced as well as the quantity of the food therein, exemplary time settings for the steam timer or the chill timer would be somewhat meaningless. In practice, these must be determined empirically in conjunction with a given apparatus. Preferably, for a desired loading, the internal temperature of the food may be monitored as by means of a thermocouple and a remote indicator and the heat processing and chilling steps continued until such time as the internal temperature set forth above is reached. By simultaneously monitoring the time required for such to occur, one may easily determined the proper time setting for the steam timer and the chill timer for future processing purposes.

I claim:
1. A method of heat processing food comprising the steps of:
   (a) placing the food to be processed in a processing zone;
   (b) surrounding the food in the zone with a gaseous atmosphere under elevated pressure prior to the application of heat to the food;
   (c) thereafter applying heat to the zone while maintaining the elevated pressure of said gaseous atmosphere until the food reaches a desired condition; and
   (d) thereafter relieving the pressure applied to the food and cooling the same.
2. A method according to claim 1 wherein the heat applied to the food is at a temperature less than the temperature of saturated steam at the pressure of the gaseous atmosphere.
3. A method according to claim 2 wherein the step of applying heat to the food is performed by introducing free steam into the processing zone.
4. A method of cooking food comprising the steps of:
   (a) supporting the food to be cooked in a gaseous atmosphere under superatmospheric pressure prior to the application of cooking heat to the food;
   (b) thereafter applying cooking heat to the food until the same is cooked to the desired degree of doneness while maintaining the food in said gaseous atmosphere under superatmospheric pressure;
   (d) thereafter rapidly cooling the cooked food while continuing to maintain the food in said gaseous atmosphere under superatmospheric pressure; and
   (d) releasing the cooked food from said gaseous atmosphere under superatmospheric pressure.
5. A method according to claim 4 wherein the step of rapidly cooling the food is performed by spraying the food with a cold liquid to lower the surface temperature of the food below 100° F. in less than four minutes.
6. A method of cooking according to claim 4 wherein step (b) is performed by initially subjecting the food to be cooked to a temperature less than the desired cooking temperature and thereafter building up the temperature to the desired cooking temperature over a predetermined time period.
7. The method of cooking food comprising the steps of:
   (a) supporting the food to be cooked in a cooking chamber at approximately ambient temperature;
   (b) surrounding the food in the chamber with air at superatmospheric pressure;
   (c) thereafter introducing steam into the chamber to apply cooking heat to the food until the food is cooked to the desired degree of doneness;
   (d) spraying the food with a spray of cold water to rapidly lower the surface temperature of the food below 70-100° F.;
   (e) gradually reducing the pressure in the chamber to atmospheric pressure; and
   (f) removing the cooked food from the chamber.
8. A method according to claim 7 wherein step (e) is initiated before the completion of step (d).
9. A method according to claim 7 wherein step (e) is initiated after the completion of step (d).
10. A method according to claim 7 especially adapted for the processing of chicken wherein step (b) is performed by introducing air into the chamber until the pressure thereof is in the range of 15-50° p.s.i.g.; and step (c) is performed by introducing steam into the chamber until the temperature therein is on the order of 225° F.
11. A method according to claim 7 especially adapted for the processing of beef wherein step (b) is performed by introducing air into the chamber until the pressure is in the range of 25-50 p.s.i.g.; and step (c) is performed by introducing steam into the chamber until the temperature therein is in the range of 25-30° F. over the desired final internal temperature of the beef.
12. A method of cooking food comprising the steps of:
   (a) supporting the food to be cooked in a cooking chamber at approximately ambient temperature;
   (b) surrounding the food in the chamber with a gaseous atmosphere under superatmospheric pressure but less than a predetermined processing pressure;
   (c) thereafter increasing the pressure within the chamber and the temperature thereof by introducing steam into the chamber to apply cooking heat to the food and to raise the pressure therein until said predetermined processing pressure is reached.
   (d) after the food has reached a desired degree of doneness, spraying the food with a spray of cold water to rapidly lower the surface temperature of the food;
   (e) gradually reducing the pressure in the chamber to atmospheric pressure; and
   (f) removing the food from the chamber.
13. A method of cooking food comprising the steps of: supporting the food to be cooked in a cooking chamber at approximately ambient temperature; introducing steam into the chamber to surround the food therewith and to pressurize the chamber; applying cooking heat to the food while under said pressure until the food is cooked to the desired degree of doneness; spraying the food with a spray of cold water to rapidly lower the surface temperature of the food; gradually reducing the pressure of the chamber to atmospheric pressure at a rate such that the surface temperature of the food will be below the temperature of saturated steam at the pressure within the chamber; and removing the cooked food from the chamber.
14. A method of cooking food comprising the steps of:
   (a) supporting the food to be cooked in a cooking chamber at approximately ambient temperature;
   (b) surrounding the food in the chamber with a gaseous atmosphere at superatmospheric pressure;
   (c) thereafter introducing steam into the chamber to apply cooking heat to the food until the internal temperature of the food is at a predetermined level less than a predetermined final temperature;

(d) retarding the application of heat to the food while permitting the internal temperature of the food to coast upwardly to said predetermined final temperature;

(e) thereafter chilling the food to rapidly lower the temperature of the same to stop further cooking;

(f) gradually reducing the pressure in the chamber to atmospheric pressure; and (g) removing the cooked food from the chamber.

15. A method according to claim 14 further including the step of maintaining the food at said predetermined final temperature for a predetermined time prior to chilling the food.

16. The method of claim 14 especially adapted for the cooking of tuna wherein the superatmospheric pressure is at least about 30 p.s.i.g. during steps (b), (c), (d) and (e); step (c) is continued until the internal temperature of the tuna is about 145° F.; and step (e) is continued until the internal temperature of the food is lowered to at least 115° F.

17. A method according to claim 7 especially adapted for the processing of seafoods such as shrimp, scallops, clams, lobster and crab wherein the superatmospheric pressure is in the range of about 15–40 p.s.i.g.; and wherein step (c) is accomplished by subjecting the seafood to a temperature in the range of 200–225° F. until the internal temperature of the food reaches approximately 160° F.

References Cited

UNITED STATES PATENTS

| 1,256,955 | 2/1918 | Trescott | 99—107 |
| 3,232,767 | 2/1966 | Payne | 99—107 |
| 1,702,854 | 2/1929 | Simonds | 99—107 X |
| 3,152,911 | 10/1964 | Segur | 99—107 |

HYMAN LORD, Primary Examiner

U.S. Cl. X.R.

99—107, 111